United States Patent Office 3,412,065
Patented Nov. 19, 1968

3,412,065
CROSS-LINKABLE HETEROCYCLIC POLYMERS
Morris L. Nielsen and Leo P. Parts, Dayton, Ohio, assignors to Monsanto Research Corporation, St. Louis, Mo., a corporation of Delaware
No Drawing. Filed Dec. 28, 1964, Ser. No. 421,658
15 Claims. (Cl. 260—47)

ABSTRACT OF THE DISCLOSURE

New heterocyclic polymers containing in the polymer chain a diazadiphosphetidine dioxide unit from which is pendant a cross-linkable group, —NH(Y), wherein Y is hydrocarbyl; together with the process for making same by means of diimidazol-1-yl phosphorus compounds. Said polymers are useful as adhesives for laminates.

This invention relates to heterocyclic polymers, especially those containing a diazadiphosphetidine dioxide unit in the polymer chain, and more particularly those in which a cross-linking unit is incorporated in the polymer chain.

An object of the invention is to prepare highly heat-resistant polymeric compounds. Another object of the invention is the provision of polymers having very good resistance to solvents. Still another object is the provision of moldable compositions having high thermal stability. A further object of the invention is the provision of a new method of particular utility for the preparation of moldable and extrudable polymers of high stability to heat and solvents. Still another object is the preparation of thermally stable adhesives. A most important object is the preparation of laminating agents for high-temperature applications.

These and other objects hereinafter defined are provided by the invention wherein there are prepared high molecular weight polymers comprising the repeating cross-linkable unit

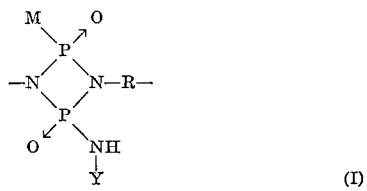

(I)

wherein M is selected from the class (1) consisting of an aromatic hydrocarbyl radical which is free of olefinic and acetylenic unsaturation, contains from 6 to 12 carbon atoms, and is linked through nuclear carbon to the remainder of the molecule, and (2) —NH(Y) wherein Y is hydrocarbyl which is free of olefinic and acetylenic unsaturation and contains from 1 to 12 carbon atoms; wherein R is selected from the class consisting of arylene, arylene-oxyarylene and polyaryleneoxyarylene radicals of from 2 to 6 oxygen ether linkages, wherein each arylene radical is hydrocarbon, is free of olefinic and acetylenic unsaturation, contains from 6 to 12 carbon atoms and is linked through non-adjacent, nuclear carbon to the remainder of the molecule.

Polymers having the above repeating unit are prepared, according to the invention, by heating an appropriate diamine with a diimidazolyl reactant selected from the class consisting of (1) at least 2 molar equivalents of a diimidazolylphosphinic amide of the formula

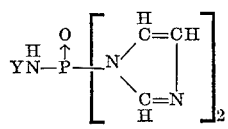

wherein Y is as defined above, and (2) a mixture of said diimidazolylphosphinic amide and a diimidazolylphosphine oxide of the formula

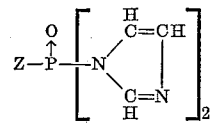

in which Z is an aromatic hydrocarbyl radical which is free of olefinic and acetylenic unsaturation, contains from 6 to 12 carbon atoms, and is linked through nuclear carbon to the remainder of the molecule to obtain a polymer having in the polymer chain at least one unit having the formula

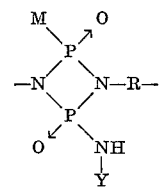

wherein M and Y are as defined above, with the balance of the repeating units of said polymer being selected from the class consisting of the same unit and the unit

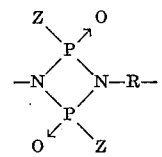

wherein Z is an aromatic hydrocarbyl radical which is free of olefinic and acetylenic unsaturation, contains from 6 to 12 carbon atoms, and is linked through nuclear carbon to the remainder of the molecule.

The phosphinic amide and the phosphine oxide may be present in any proportion, the number of units derived from the amide and from the oxide being governed by the proportion of these reactants in the mixture. The sum of the molar equivalents of diimidazol-1-yl phosphorus compounds should be two with respect to the diamine.

The aromatic diamine condenses with the diimidazol-1-yl phosphorus compound by displacement of imidazole and formation of the diazadiphosphetidine dioxide structure in which the remaining

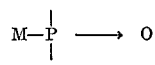

moiety is bridged between the amino nitrogens of two molecules of the diamine. Polymers prepared by the reaction of a diamine with two molar equivalents of any aryldiimidazol-1-yl phosphine oxide and the method of making them are disclosed in the copending application of Leo P. Parts and Morris L. Nielsen, Ser. No. 326,232, filed Nov. 26, 1963, now U.S. Patent 3,290,259. The polymers so obtained consist of the diazadiphosphetidine dioxide unit:

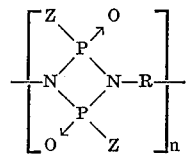

wherein Z is an aromatic hydrocarbyl radical which is free of olefinic and acetylenic unsaturation, contains from 6 to 12 carbon atoms, and is linked through nuclear carbon to the remainder of the molecule, and R is selected from the class consisting of arylene, aryleneoxyarylene and polyaryleneoxyarylene radicals of from 2 to 6 oxygen ether linkages, wherein each arylene radical is hydrocarbon, is free of olefinic and acetylenic unsaturation, contains from 6 to 12 carbon atoms and is linked through non-adjacent, nuclear carbon to the remainder of the molecule.

Those of the present polymers which contain the above unit differ from those described in the above copending application in that they are prepared from a mixture of diimidazol-1-yl phosphorus compounds containing a significant proportion, e.g., over 1 percent by weight of diimidazol-1-yl-N-hydrocarbylphosphinic amides. The purpose of such phosphinic amides is to incorporate cross-linkable properties into the polymers. By so tailoring the polymers, they are convertible from the linear, typically fusible thermoplastic materials into hard, cross-linked thermosetting resins.

The use of diimidazol-1-yl-N-hydrocarbylphosphinic amides in the reaction mixture yields polymer chains containing diazadiphosphetidine oxide units wherein one or both phosphorus atoms bear N-hydrocarbyl substituents, thus

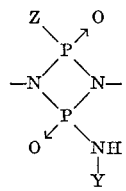

or

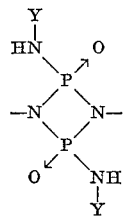

Whether or not only one or both units are present in the polymer depends upon whether or not a phosphine oxide is used as a reactant. However, a unit containing the P—NH(Y) moiety must be present to permit cross-linking upon curing at either atmospheric pressure, at elevated pressure or under vacuum. This occurs by elimination of an amine, according to the scheme

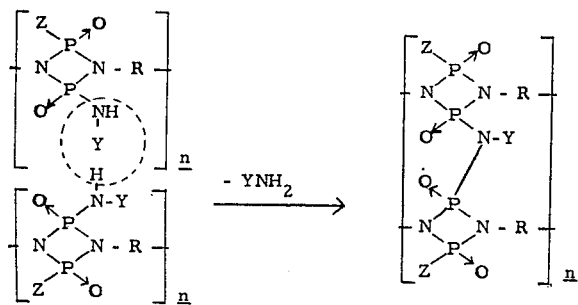

Even one P—NH(Y) moiety in a polymer chain makes such cross-linking possible. Generally, however, it is preferred that at least 1 percent of the polymer units contain one or two of said moieties.

It is a familiar fact in polymer chemistry that the properties of a cross-linked polymer differ considerable from those of a polymer which is not cross-linked. As the degree of cross-linking increases, the solubility of a polymer in solvents decreases, the softening temperature is raised, and such a polymer becomes more resistant to environmental conditions. With a very high degree of cross-linking, such a polymer is often a nonfusible brittle resin. It is thus apparent that the useful properties can be modified by the degree of cross-linking. When the initially formed polymer chain in the present invention is not subjected to curing conditions, no cross-linking occurs and the product is a linear polymer.

The presently prepared polymers are thus linear, polymeric solids which are generally thermoplastic until cross-linked by curing. They soften and are extrudable below about 300° C. The linear polymers are readily compression molded by heating at below this temperature to give well-dimensioned, smooth, shaped objects of good mechanical strength. Either before or after molding at below about 300° C., the polymers are cross-linkable by heating them to above this temperature, but below their decomposition temperature, which is usually above 450° C. The temperature at which the cross-linking reaction occurs is somewhat dependent upon the nature of the N-hydrocarbyl substituent on the diazadiphosphetidine unit, so that it may occur at, say, from 250° C. to 400° C. or even higher. When N-phenyl is used, cross-linking proceeds at a useful rate above 340° C.

Ordinarily it is advantageous to apply the polymer in its cross-linkable state, as for example in making laminates, so that its thermoplastic properties may be utilized; subsequently the polymer is cross-linked as described above in order to get a stable, tenacious bond comprising the cross-linked polymer. Alternately, the polymer may be cross-linked immediately after or even during the polymerization step by suitable control of temperature and pressure so that the product is a cross-linked resin.

The diimidazol-1-yl-N-hydrocarbylphosphinic amides which are employed for preparing the presently provided polymers and the methods of making them are disclosed in the copending application of Morris L. Nielsen and Robert Z. Greenley, Ser. No. 421,657, filed of even date, now abandoned and refiled as a continuation-in-part application Ser. No. 576,537, filed Sept. 1, 1966. As shown in said application, they are obtained either by the reaction of an appropriate amine with triimidazol-1-ylphosphine oxide as follows:

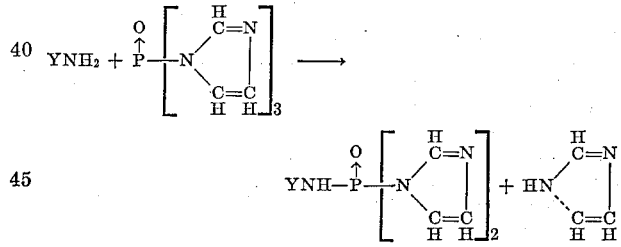

or by the reaction of an N-hydrocarbylphosphoramidic dihalide with an alkali metal imidazolide as follows:

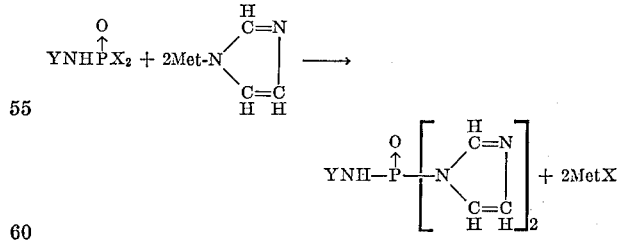

wherein Y is hydrocarbyl which is free of olefinic and acetylenic unsaturation and contains from 1 to 12 carbon atoms. Met is alkali metal and X is halogen with atomic weight greater than 30.

The reactants are simply mixed and heated at temperatures of, say, 30° C. to 80° C. until the formation of said diimidazol-1-yl-N-hydrocarbylphosphinic amide is completed. An inert, organic liquid diluent or solvent such as toluene is conveniently employed.

Examples of the presently useful phosphinic amides are diimidazol-1-ylmethyl-, diimidazol-1-ylethyl-, diimidazol-1-yl-n-propyl-, diimidazol-1-ylcyclohexyl-, diimidazol-1-ylbenzyl-, diimidazol - 1 - ylphenyl-, diimidazol-1-yl-1-naphthyl-, and diimidazol - 1 - yl - 1 - biphenylphosphinic amide.

The aryldiimidazol-1-ylphosphine oxides which are employed for preparing the presently provided polymers and the method of making them are disclosed in the copending application of R. Z. Greenley and M. L. Nielsen, Ser. No. 294,179, filed July 10, 1963, now U.S. Patent 3,227,727. As shown in said application, they are obtained by the reaction of an appropriate phosphonic dihalide with imidazole, as follows:

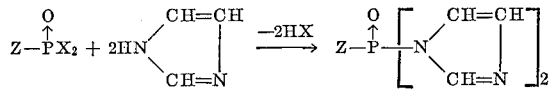

wherein Z is the aromatic hydrocarbyl radical defined above and X is halogen having an atomic weight of at least 35. The reaction is effected by simply mixing the two reactants, advantageously in the presence of a basic agent to serve as hydrogen halide scavenger, and allowing the resulting mixture to stand until formation of said phosphine oxide is completed. Operating temperatures of, say, from 60° C. to 150° C. are useful, and an inert, organic liquid diluent or solvent such as tetrahydrofuran is conveniently employed.

Examples of the presently useful phosphine oxides are diimidazol-1-ylphenyl-, diimidazol-1-yl-(o-, m- or p-tolyl-), diimidazol-1-yl-(o-, m- or p-isopropylphenyl-), diimidazol-1-yl-(p-hexylphenyl), (3,4- or 4,5-diethylphenyl)diimidazol-1-yl-, diimidazol-1-yl-(pentamethylphenyl)-, (o-, m- or p-cyclopentylphenyl)diimidazol-1-yl-, (o-, m- or p-biphenylyl)diimidazol-1-yl-, diimidazol-1-yl-α- or β-naphthyl-, or 3-acenaphthenyldiimidazol-1-ylphosphonic oxide.

The diamines with which the aryldiimidazol-1-ylphosphine oxides are reacted are generally compounds in which two primary amino groups are bridged by a hydrocarbon arylene or aryleneoxyarylene or polyaryleneoxyarylene radical.

Examples of presently useful arylene diamines include o-, m- or p-phenylenediamine, benzidine, 2,2'-, 3,3'-, 3,4'-, 2,4- or 2,4'-diaminobiphenyl, 5,6-acenaphthenediamine, 2,7-fluorenediamine and 1,4- or 1,5-naphthalenediamine.

The arylene group may or may not contain aliphatic or cycloaliphatic substituents, e.g., the diamine may be toluene-2,4- or 2,5- or 2,6- or 3,5-diamine, 2,4,6-triethyl-m-phenylenediamine, 3,5-dimethyl-p-phenylenediamine, 2,5-di-tert-butyl-p-phenylenediamine, diaminodurene, 2,2'-diethylbenzidine, 3-hexyl-p-phenylenediamine, 3-cyclopropyl-p-phenylenediamine, 4-cyclohexyl-m-phenylenediamine, 2-ethyl-1,4-naphthalenediamine, etc.

The useful aryleneoxyarylene diamines include, e.g., 3,3'- or 4,4'-oxydianiline, bis(p-amino-o-methylphenyl) ether bis(m-amion-4-biphenylyl) ether, bis(aminofluorenyl) ether, bis(α-amino-β-naphthyl) ether, etc.

Examples of useful polyaryleneoxyarylene diamines are polyphenyl or poly(alkylphenyl) ethers containing from 3 to 7 phenyl groups and from 2 to 6 oxygen linkages, and nuclearly substituted at non-adjacent carbon atoms by a primary amino radical at each of the terminal phenyl rings such as p-bis(p-aminophenoxy)benzene, o-bis[(p-aminophenoxy)phenyl] ether or p-bis[p-[-(p-aminophenoxy)-phenoxy]phenoxy]benzene or homologs thereof wherein one or more phenylene groups are substituted by alkyl groups. One or more of the arylene linkages may be biphenylylene or naphthylylene or acenaphthylylene groups.

Two or more different diamines may be reacted with the diimidazol-1-yl phosphorus compounds, e.g., a mixture of an arylene diamine such as p-phenylene diamine and an arylene-oxyarylenediamine such as 4,4'-oxydianiline to obtain polymers having varying alternating linkages or differing linkages dispersed more or less randomly in the polymer chain. Such an expedient is useful in tailoring polymer structures having properties intermediate to those attributable to the individual linkages.

In the reaction of the diamine with the diimidazol-1-yl phosphorus compounds there is obtained by-product imidaozle to the extent of four moles per polymer unit. This imidazole is generally recovered quantitatively in a substantially pure state and can be readily used for making a new supply of the diimidazol-1-yl phosphorus compounds for the polymerization reaction.

Preparation of the presently provided polymers takes place by simply heating the diamine with substantially two molar equivalents of the diimidazol-1-yl phosphorus compounds at a temperature of from, say, 50° C. to 340° C. at ordinary, decreased or increased pressure and in the presence or absence of a liquid diluent or solvent. The reaction takes place readily in the absence of a catalyst; however, a catalyst, preferably basic, may be employed. Operation in an inert atmosphere, e.g., under nitrogen or argon may be useful, particularly in experimental runs, but is not required. The nature of solvent or diluent will depend upon the specific reactants which are used as well as upon the temperature and pressure conditions. Virtually any liquid which is inert under the reaction conditions may be used as diluent; and as will be obvious to those skilled in the art, a low-boiling diluent generally will not be employed when the process is conducted at high temperatures or under substantially decreased pressure. That the solvent or diluent be inert under the reaction conditions is a requirement which eliminates, generally, compounds having a labile hydrogen, since such materials may react with the diimidazol-1-yl phosphorus compounds and thus reduce or entirely suppress reaction with the present diamine reactant. The commonly known, comparatively unreactive materials such as the ethers, the nitrohydrocarbons or the tertiary nitrogen heterocyclics are useful. Advantageously, for facilitating removal of the diluent, it should be one which is a solvent for the initial diimidazol-1-yl phosphorus compounds and the diamine and a non-solvent for the polymer, or it should be volatilizable from the reaction mixture at a temperature which is below the decomposition point of the polymer. For working at the lower temperatures of the operable temperature range, solvents such as pyridine, nitrobenzene and diglyme are useful. Within the higher temperature ranges, solvents such as quinoline, phenyl ether and the polyphenyl ethers are conveniently employed. The use of a solvent will depend to some extent upon the nature of the reactants as well as upon the extent of heating. When both reactants are solids at the desired operating temperature, a diluent will be generally useful; on the other hand, when one or both of the reactants is a liquid or melts readily at the contemplated reaction temperature, a diluent need not be used unless the diamine is extremely reactive. In that case, the use of an inert diluent will serve to moderate the reaction.

As stated above, the temperature at which reaction is effected is variable; for here again must be taken into consideration the nature of the reactants, whether or not a catalyst and/or diluent is used, and the pressure at which the reaction is conducted. Some of the present polymerizations can be conducted by heating, say, at temperatures of from 50° C. to 150° C. at ordinary atmospheric pressure. In other instances, heating of the reaction mixture at higher temperatures, say, at temperatures of from 150° C. to 340° C. and preferably at from 200° C. to 250° C. will be found to give optimum conversion. All these variables, i.e., use of and nature of diluent, inert atmosphere, catalyst, temperature and pressure can be readily arrived at by easy experimentation. Since reaction may be evidenced by dissolution of the reactants, change in viscosity, precipitation of polymer, etc., the extent of such change will be indicative of reaction. Very rapid reaction, as evidenced by rapid viscosity change or foaming and gelling will show the need for a diluent and/or lower temperature and/or shorter heating and/or no catalyst if one has been employed. Conversely, no reaction or only very slow reaction will indicate the use of more extreme conditions. Thus, arrival at optimum reaction conditions is simply a matter of routine procedure well within the province of one skilled in the art. To assure complete reaction in experimental runs, it is generally recommended that the temperature of the reaction mixture be increased after primary evidences of reaction have subsided.

The by-product imidazole is a high-boiling (255–6° C.) material. Various procedures may be used for separating the polymer product therefrom, e.g., simple filtration or decanting and washing, solvent extraction, distillation, etc. The imidazole is generally much more soluble than the polymer; this fact permits easy removal of the imidazole by washing. However, since it is desirable to recover the imidazole in as high a state of purity as possible, it is convenient to apply vacuum to the system and to continue heating after the polymerization reaction has subsided in order to distill or sublime the imidazole. When the polymerization has been effected in the presence of a diluent or solvent, the latter is thereby also removed. Again, for the sake of economic operation, it is advantageous to employ a solvent or diluent whose volatility differs essentially from that of the imidazole; otherwise, a separation of imidazole from the diluent would be involved. When the polymerization has been conducted in the absence of a solvent or diluent and the reactants are employed in the stoichiometric proportions, generally the polymer remains in the reaction mixture as a suspension of solid in the imidazole. As pointed out above, it may be simply filtered off, washed and dried; or, the imidazole may be evacuated from the system.

To recapitulate: In the preparation of the diazadiphosphetidine dioxide polymers, substantially one mole of the aromatic or heterocyclic diamine is mixed with substantially two molar equivalents of the diimidazol-1-ylphosphorus reactant and the mixture is heated, in presence or absence of a solvent or diluent or catalyst, at a temperature which may be as low as 100° C. and as high as, say, 340° C., at ordinary, increased or decreased pressure. The availability of substantially two moles of the combine ddiimidazol-1-yl phosphorus compounds for substantially each mole of the diamino compound is important for obtaining a polymer having the diazadiphosphetidine unit.

The invention is further illustrated by, but not limited to, the following examples.

Example 1

A mixture consisting of 11.85 g., 0.0459 mole, of diimidazol-1-ylphenylphosphine oxide, 4.2 g., 0.0153 mole, of diimidazol-1-yl-N-phenylphosphinic amide, 6.12 g., 0.0306 mole, of oxydianiline, and 35 ml. quinoline was heated in a nitrogen atmosphere using an oil bath at a temperature of 180° C. to 250° C. for six hours with stirring. The homogeneous mixture was then cooled and the container evacuated so as to remove solvent and imidazole. The temperature was raised to 300° C. to remove imidazole. The residue was a light-colored foamed polymer weighing 14.5 g. It was soluble in quinoline. It softened at about 190° C.

Example 2

A polymer prepared as described in Example 1 was tested in an extruder. This device consisted of a hollow cylinder for containing the polymer, an outlet orifice of about 0.08″ diameter in which was fitted a removable plug, a piston ram fitting the cylinder by which pressure could be applied against the polymer, a means of heating the cylinder, and a means of observing the temperature of the polymer.

As the polymer was heated, it softened and liquefied at about 200° C. so that it would readily extrude under very little pressure when the plug was removed from the orifice. By continuously raising the temperature of the polymer and periodically testing for extrusion by removing the plug and applying pressure to the piston ram, it was found that extrusion occurred at successive temperatures of 298°, 318°, 332° and 348° C. At 356° C., no extrusion occurred even under 18,000 p.s.i. pressure. When cooled, the residual polymer was a dense cylinder having a density of 1.30 g./cc.

Example 3

A laminate was prepared, using a polymer prepared substantially as described in Example 2. Three layers of glass cloth, with finely crushed polymer between layers as well as covering the outer surfaces, were heated to 360° C. Thereupon 500 p.s.i. pressure was applied and the laminate further heated to 400° C. for 1 hour. On cooling to room temperature, a hard, sound laminate was obtained with a resin content of 33% and a density of 1.67 g./cc. The flexural strength of the laminate, measured at room temperature, dropped only 2% after environmental testing at 600° F. in air for 1 hour.

It will be understood that the present polymers have wide application in the plastics and adhesives field and that the invention is not limited to use thereof in compression molding and metal or glass bonding. Paper, cloth, or wood may be impregnated with the polymers and bonded thereby by use of the herein described polymeric adhesives. Fillers, plasticizers, pigments, etc., may be employed with the polymers without excessive loss of dry bond strength or deterioration of the inherent thermal stability of the present polymers.

Since many widely different embodiments of this invention may be made without departing from the spirit and scope thereof, the invention is limited only as set forth in the following claims.

What we claim is:

1. A solid, cross-linkable polymer consisting essentially of the repeating cross-linkable unit

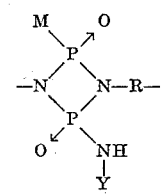

wherein M is selected from the class consisting of (1) an aromatic hydrocarbyl radical which is free of olefinic and acetylenic unsaturation, contains from 6 to 12 carbon atoms, and is linked through nuclear carbon to the remainder of the molecule, and (2) —NH(Y) wherein Y is hydrocarbyl which is free of olefinic and acetylenic unsaturation and contains from 1 to 12 carbon atoms; wherein R is selected from the class consisting of arylene, aryleneoxyarylene and polyaryleneoxyarylene radicals of from 2 to 6 oxygen ether linkages, wherein each arylene radical is hydrocarbon, is free of olefinic and acetylenic unsaturation, contains from 6 to 12 carbon atoms and is linked through non-adjacent, nuclear carbon to the remainder of the molecule.

2. The polymer defined in claim 1, further limited in that M is the radical —NH(Y).

3. A solid, cross-linkable polymer consisting essentially of the repeating cross-linkable unit

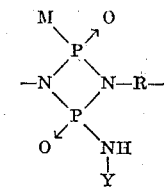

(I)

and the repeating unit

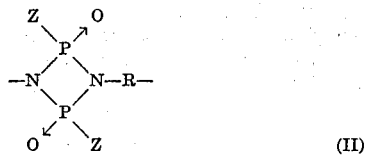

wherein M is selected from the class consisting of (1) an aromatic hydrocarbyl radical which is free of olefinic and acetylenic unsaturation, contains from 6 to 12 carbon atoms, and is linked through nuclear carbon to the remainder of the molecule, and (2) —NH(Y) where Y is hydrocarbyl which is free of olefinic and acetylenic unsaturation and contains from 1 to 12 carbon atoms; wherein R is selected from the class consisting of arylene, aryleneoxyarylene and polyaryleneoxyarylene radicals of from 2 to 6 oxygen ether linkages, wherein each arylene radical is hydrocarbon, is free of olefinic and acetylenic unsaturation, contains from 6 to 12 carbon atoms and is linked through non-adjacent, nuclear carbon to the remainder of the molecule; wherein Z is an aromatic hydrocarbyl radical which is free of olefinic and acetylenic unsaturation, contains from 6 to 12 carbon atoms, and is linked through nuclear carbon to the remainder of the molecule and in which the percentage of (I) is at least 1% by weight.

4. The polymer defined in claim 2, further limited in that M is an aromatic hydrocarbyl radical which is free of olefinic and acetylenic unsaturation, contains from 6 to 12 carbon atoms, and is linked through nuclear carbon to the remainder of the molecule, and R is aryleneoxyarylene.

5. The polymer defined in claim 2, further limited in that M is the radical —NH(Y) and R is aryleneoxyarylene.

6. A solid, cross-linkable polymer consisting essentially of the repeating cross-linkable units

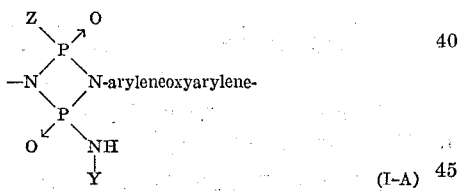

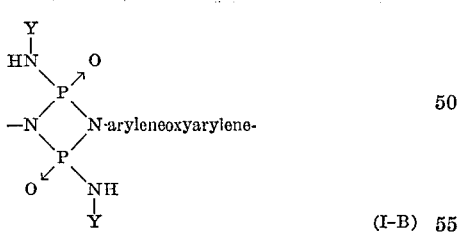

and the repeating unit

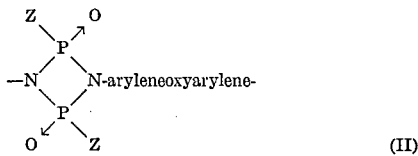

wherein arylene is hydrocarbon, is free of olefinic and acetylenic unsaturation, contains from 6 to 12 carbon atoms and is linked through nuclear carbon to the remainder of the molecule, Y is hydrocarbyl which is free of olefinic and acetylenic unsaturation and contains from 1 to 12 carbon atoms, and Z is an aromatic hydrocarbyl radical which is free of olefinic and acetylenic unsaturation, contains from 6 to 12 carbon atoms, and is linked through nuclear carbon to the remainder of the molecule, and in which the percentage of I–A and I–B combined together is at least 1% by weight of the total.

7. The polymer defined in claim 3, further limited in that M is the radical —NH(Y) and R is aryleneoxyarylene.

8. A solid, cross-linkable polymer consisting essentially of the repeating cross-linkable unit

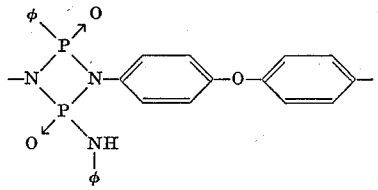

and the repeating unit

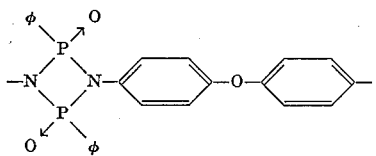

where $\phi$ denotes phenyl, and in which the percentage of the cross-linkable unit is at least 1% by weight based on the total.

9. The solid polymer obtained by heating the polymer defined in claim 1 until cross-linked.

10. The method of preparing a solid polymeric product which comprises heating at a temperature of 100° to 300° C. a diamine of the formula $$H_2N-R-NH_2$$

where R is selected from the class consisting of arylene, aryleneoxyarylene and polyaryleneoxyarylene radicals of from 2 to 6 oxygen ether linkages, wherein each arylene radical is hydrocarbon, is free of olefinic and acetylenic unsaturation, contains from 6 to 12 carbon atoms and is linked through non-adjacent, nuclear carbon to the remainder of the molecule with at least 2 molar equivalents of a diimidazolyl phosphorus reactants selected from the class consisting of (1) a diimidazolylphosphinic amide of the formula

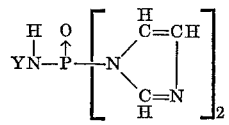

wherein Y is hydrocarbyl which is free of olefinic and acetylenic unsaturation and contains from 1 to 12 carbon atoms, and (2) a mixture of at least 1% by weight of said diimidazolylphosphinic amide and a diimidazolylphosphine oxide of the formula

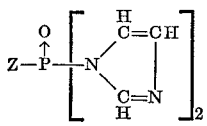

in which Z is an aromatic hydrocarbyl radical which is free of olefinic and acetylenic unsaturation, contains from 6 to 12 carbon atoms, and is linked through nuclear carbon to the remainder of the molecule to obtain a polymer having in the polymer chain at least one unit having the formula

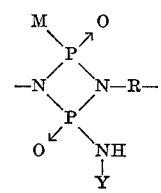

wherein M is selected from the class consisting of (1) an aromatic hydrocarbyl radical which is free of olefinic and acetylenic unsaturation, contains from 6 to 12 carbon atoms, and is linked through nuclear carbon to the remainder of the molecule, and (2) —NH(Y) wherein Y is as defined above.

11. The method defined in claim 10, further limited in that the diimidazolyl phosphorus reactant is a mixture of at least 1% by weight of a diimidazol-1-yl-N-hydrocarbylphosphinic amide of the formula

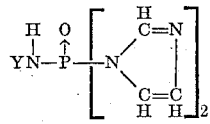

in which Y is hydrocarbyl which is free of olefinic and acetylenic unsaturation and contains from 1 to 12 carbon atoms and an aryldiimidazol-1-ylphosphine oxide of the formula

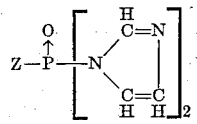

in which Z is an aromatic hydrocarbyl radical which is free of olefinic and acetylenic unsaturation, contains from 6 to 12 carbon atoms, and is linked through nuclear carbon to the remainder of the molecule.

12. The method defined in claim 10, further limited in that the diimidazolyl phosphorus reactant has the formula

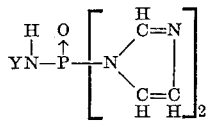

in which Y is hydrocarbyl which is free of olefinic and acetylenic unsaturation and contains from 1 to 12 carbon atoms.

13. The method defined in claim 10, further limited in that R is aryleneoxyarylenediamine and the diimidazolyl phosphorus reactant is a mixture of at least 1% by weight of a diimidazol-1-yl-N-hydrocarbylphosphinic amide of the formula

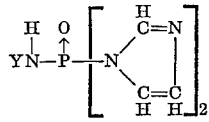

in which Y is hydrocarbyl which is free of olefinic and acetylenic unsaturation and contains from 1 to 12 carbon atoms and an aryldiimidazol-1-ylphosphine oxide of the formula

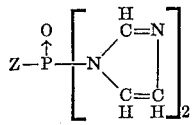

in which Z is an aromatic hydrocarbyl radical which is free of olefinic and acetylenic unsaturation, contains from 6 to 12 carbon atoms, and is linked through nuclear carbon to the remainder of the molecule.

14. The method defined in claim 10, further limited in that R is aryleneoxyarylene and the diimidazolyl phosphorus reactant has the formula

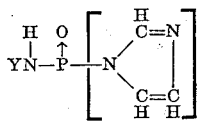

in which Y is hydrocarbyl which is free of olefinic and acetylenic unsaturation and contains from 1 to 12 carbon atoms.

15. The method of preparing a solid polymeric product which comprises heating 4,4'-oxydianiline with at least 2 molar equivalents of a mixture of at least 1% by weight of diimidazol-1-yl-N-phenylphosphinic amide and diimidazol-1-ylphenylphosphine oxide at a temperature of 100° to 300° C.

References Cited

UNITED STATES PATENTS 3,244,647   4/1966   Greenley et al. _____ 260—2
3,290,259   12/1966  Parts et al. _____ 260—2

OTHER REFERENCES

Greenley et al.: "Jour. Organic Chemistry," vol. 29, May 1964, pp. 1009–1013.

SAMUEL H. BLECH, *Primary Examiner.*